(12) United States Patent
Hande et al.

(10) Patent No.: US 8,807,224 B2
(45) Date of Patent: Aug. 19, 2014

(54) SUBSEA ARRANGEMENT

(75) Inventors: Olav Hande, Asker (NO); Bjornar Bakken, Blommenholm (NO); Jon Flidh, Mjondalen (NO); Paula Guimaraes, legal representative, Porto (PT)

(73) Assignee: Vetco Gray Scandinavia AS, Sandvika (NO)

( * ) Notice: Subject to any disclaimer, the term of this patent is extended or adjusted under 35 U.S.C. 154(b) by 164 days.

(21) Appl. No.: 13/327,818

(22) Filed: Dec. 16, 2011
(Under 37 CFR 1.47)

(65) Prior Publication Data
US 2012/0227972 A1    Sep. 13, 2012

(51) Int. Cl.
*E21B 34/00*  (2006.01)

(52) U.S. Cl.
USPC ......... 166/335; 166/363; 166/324; 166/332.7

(58) Field of Classification Search
USPC .................. 166/363, 364, 324; 441/28, 29
See application file for complete search history.

(56) References Cited

U.S. PATENT DOCUMENTS

| 3,273,181 A * | 9/1966 | Beck, Jr. .......................... 441/29 |
| 6,615,923 B1 | 9/2003 | Lay, Jr. et al. |
| 2011/0056452 A1 | 3/2011 | Horner et al. |

FOREIGN PATENT DOCUMENTS

| GB | 1 433 446 | 4/1976 |
| WO | WO 01/63088 A1 | 8/2001 |

OTHER PUBLICATIONS

Norwegian Search Report from Norwegian App. No. 20101771, dated 2011 Jul. 14, 2 pages.
GB Search Report, Application No. GB1121627.2, Dated Feb. 22, 2012.

* cited by examiner

*Primary Examiner* — James Sayre
(74) *Attorney, Agent, or Firm* — Bracewell & Giuliani LLP

(57) ABSTRACT

A subsea arrangement comprising an external casing and a pressure equalizing valve for equalization of the fluid pressure in an internal space of the casing. The pressure equalizing valve is provided with a valve body including a base section displaceably received in an opening provided in the casing; and a valve member secured to the base section and arranged inside the casing, the valve member facing a valve seat surrounding said opening. The valve body is displaceable upwards, under the effect of an external fluid pressure, from a resting position, in which the valve member prevents fluid flow into and out of said internal space, to a raised position, in which the valve member allows fluid flow from the surroundings into said internal space for equalization of the fluid pressure therein when the subsea arrangement is lowered into the sea.

20 Claims, 2 Drawing Sheets

SUBSEA ARRANGEMENT

CROSS-REFERENCE TO RELATED APPLICATION

This application claims priority to and the benefit of co-pending Norwegian Application No. 20101771, by Olav Hande et al., filed on Dec. 17, 2010, entitled "A SUBSEA ARRANGEMENT", which application is incorporated herein by reference.

FIELD OF THE INVENTION

The present invention relates to a subsea arrangement comprising an external casing, which encloses an internal space for accommodating fluid, and a pressure equalizing valve for equalization of the fluid pressure in said space.

BACKGROUND OF THE INVENTION

In connection with oil and gas producing installations it is well known that rapid cooling of the production fluid during normal production and particularly during temporary interruption of the production may result in the formation of hydrates, which may cause clogging of pipes and pipe connections. To delay cooling of the production fluid in case of an interruption of the production, some form of thermal insulation and heat storage medium has to be provided to the element through which the production fluid flows. Said element could for instance be a pipe, a manifold, a valve, a connector etc. WO 01/63088A1 and WO 2006/106406A1 disclose the use of a so-called heat bank for thermally insulating one or more elements included in a subsea installation. The heat bank comprises a casing, which is arranged to enclose a fluid having heat-storing capacity, for instance sea water, and which has an internal space for receiving said element or elements and said fluid with the fluid surrounding the respective element so as to allow the fluid to delay cooling of the element by means of heat stored in the fluid. Thus, by means of heat stored in the fluid inside the casing, the heat bank protects the respective element from cooling too rapidly. The fluid in the heat bank is heated by heat emitted from the protected element or elements during normal operation.

When a heat bank, or any other arrangement intended to contain fluid enclosed in a casing, is lowered into the sea, the casing will be subjected to an external load caused by the hydrostatic pressure of the surrounding sea water. The hydrostatic pressure and thereby the external load on the casing will gradually increase as the depth increases. In order to prevent the casing from collapsing at greater sea depths due to this external load, the pressure of the fluid inside the casing has to be balanced against the ambient sea water pressure by means of a pressure balancing device. There is a need for a simple and reliable pressure balancing device that is suitable for use in a heat bank or any other subsea arrangement that is to be lowered into the sea.

SUMMARY OF THE INVENTION

The object of the present invention is to provide a subsea arrangement having a simple and reliable pressure equalizing valve for balancing the pressure of a fluid inside a casing of the subsea arrangement against ambient sea water pressure.

According to the invention, this object is achieved by a subsea arrangement having the features defined in claim 1.

The subsea arrangement of the present invention comprises an external casing, which encloses an internal space for accommodating fluid, and a pressure equalizing valve for equalization of the fluid pressure in said space. The pressure equalizing valve is provided with a valve body comprising a base section and a valve member, which is secured to the base section and arranged inside the casing. The base section extends through an opening provided in the casing and is displaceably received in this opening. The valve member extends laterally from the base section beyond the circumference of said opening in the casing and faces a valve seat surrounding this opening. The valve body is axially displaceable upwards, under the effect of an external fluid pressure acting on the valve body, from a resting position, in which the valve member is in sealing contact with the valve seat and thereby prevents fluid flow into and out of said internal space, to a raised position, in which the valve member is raised from the valve seat and thereby allows fluid flow from the surroundings into said internal space for equalization of the fluid pressure therein when the subsea arrangement is lowered into the sea. The valve body is axially displaceable downwards, under the effect of gravity, from the raised position to the resting position.

Thus, the pressure equalizing valve will automatically open under the effect of the external hydrostatic pressure acting on the valve body when the subsea arrangement is lowered into the sea and thereby allow sea water to flow into the internal space of the casing. Hereby, the pressure of the fluid in the internal space of the casing is balanced against the ambient sea water pressure during the lowering of the subsea arrangement into the sea. When the subsea arrangement has been installed at a subsea installation, the pressure equalizing valve will, under the effect of gravity, remain closed and thereby prevent fluid flow into or out of said internal space. This pressure equalizing valve has a very simple and reliable construction and can be used in any subsea arrangement where an inflow of sea water into an internal space of the subsea arrangement can be accepted during the lowering of the subsea arrangement into the sea. When the subsea arrangement has been installed at the desired depth of the sea, the pressure equalizing valve has fulfilled its pressure equalizing function and no more movement of the valve body is required. The valve body is then only to remain in its resting position.

Further advantages as well as advantageous features of the subsea arrangement according to the present invention will appear from the dependent claims and the following description.

BRIEF DESCRIPTION OF THE DRAWINGS

With reference to the appended drawings, a specific description of preferred embodiments of the invention cited as examples follows below. In the drawings.

DETAILED DESCRIPTION OF THE INVENTION

Figure 1:
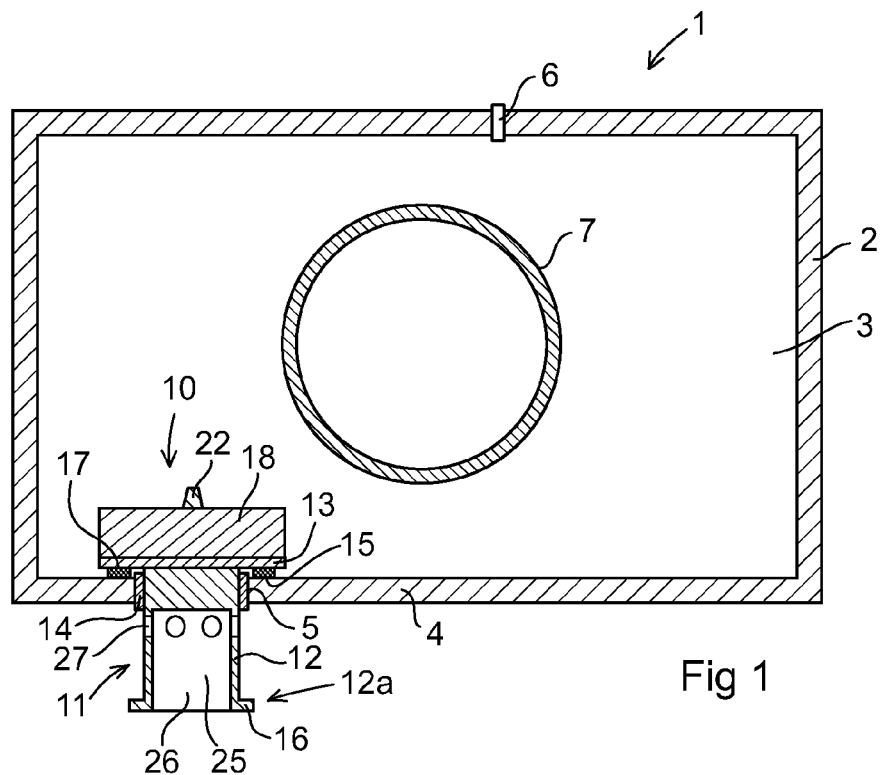
FIG. 1 is a schematic illustration of a subsea arrangement according to the invention, as seen in a longitudinal section with the pressure equalizing valve in a closed position.
Figure 2:
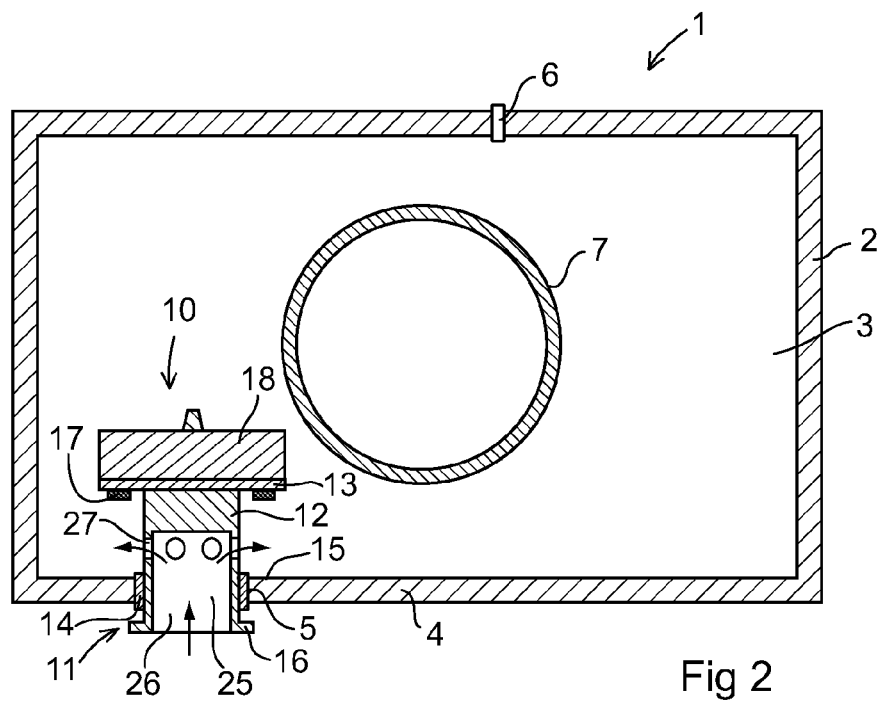
FIG. 2 shows the subsea arrangement of FIG. 1 with the pressure equalizing valve in an open position.

A subsea arrangement 1 according to an embodiment of the present invention is illustrated in FIGS. 1 and 2.

The subsea arrangement 1 comprises an external casing 2, which encloses an internal space 3 intended to contain fluid. The subsea arrangement 1 is provided with a pressure equalizing valve 10 for equalization of the fluid pressure in said space 3.

The pressure equalizing valve 10 is provided with a valve body 11, which comprises a base section 12 and a valve member 13. The valve member 13 is secured to the base section 12 and arranged inside the casing 2. The base section 12 extends through an opening 5 provided in the casing 2 and is displaceably received in this opening 5. The base section 12 is with advantage mounted to the opening 5 in the casing through a slide bearing 14, as illustrated in FIGS. 1 and 2. The valve member 13 extends laterally from the base section 12 beyond the circumference of the opening 5 in the casing and faces a valve seat 15 surrounding this opening 5.

In the illustrated embodiment, the above-mentioned opening 5 is provided in a bottom wall 4 of the casing 2.

Figure 3:
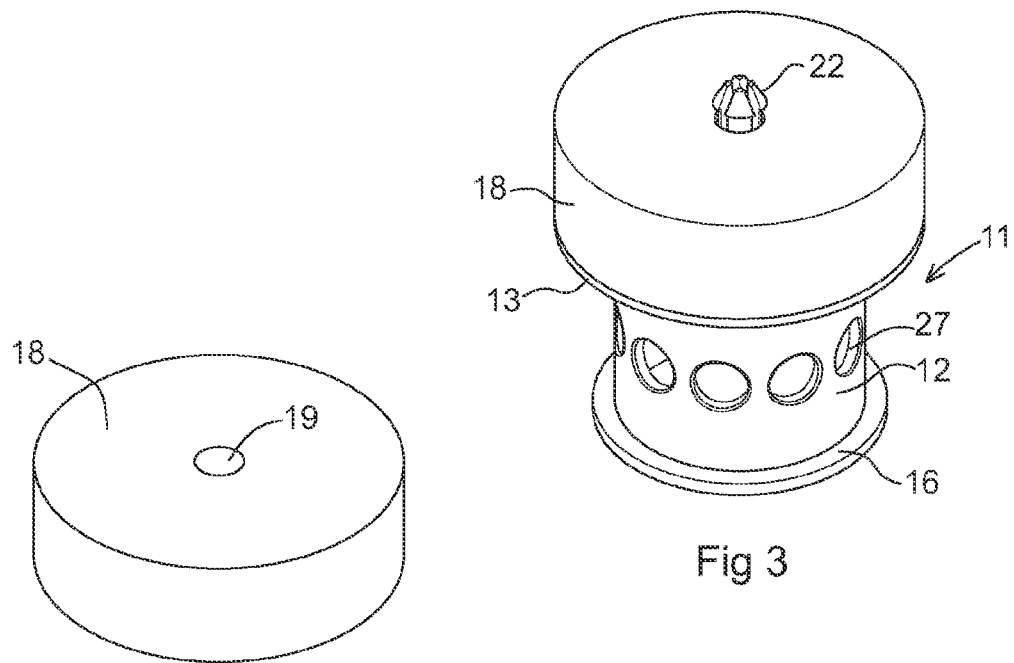
FIG. 3 is a perspective view of a valve body included in the pressure equalizing valve shown in FIGS. 1 and 2, with a weight mounted to the valve body.
Figure 4:
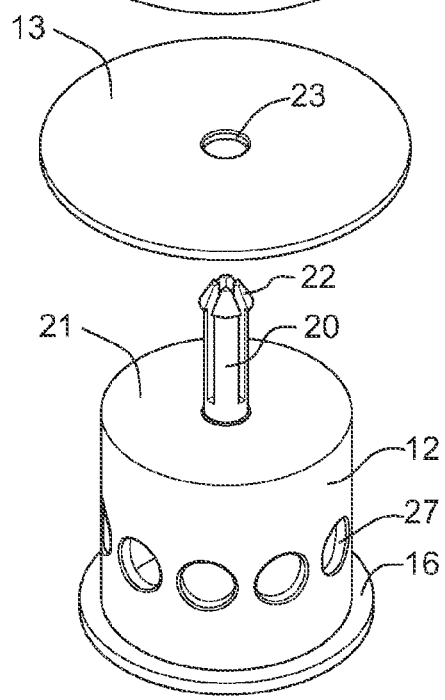
FIG. 4 shows said valve body and said weight in an exploded view.

The base section 12 has a cylindrical shape, preferably a circular cylindrical shape as illustrated in FIGS. 3 and 4. The opening 5 in the casing has a shape adapted to the cross-sectional shape of the base section 12 to allow the base section to move axially upwards and downwards in the opening 5.

The valve body 11 is axially displaceable upwards, under the effect of an external fluid pressure acting on the valve body 11, from a resting position (see FIG. 1), in which the valve member 13 is in sealing contact with the valve seat 15 and thereby prevents fluid flow into and out of the internal space 3 of the casing, to a raised position (see FIG. 2), in which the valve member 13 is raised from the valve seat 15 and thereby allows fluid flow from the surroundings into said internal space 3 for equalization of the fluid pressure therein when the subsea arrangement 1 is lowered into the sea. The valve body 11 is axially displaceable downwards, under the effect of gravity, from the raised position to the resting position. Thus, the pressure equalizing valve 10 acts like a non-return valve preventing fluid in the internal space 3 of the casing from flowing out into the surroundings through the opening 5 in the bottom wall 4 of the casing, while allowing fluid to flow from the surroundings into the internal space 3 of the casing through said opening 5 when the external fluid pressure acting on the casing 2 exceeds the pressure of the fluid in the internal space 13 of the casing to a given extent. Hereby, the difference between the fluid pressure inside the casing 2 and the fluid pressure on the outside of the casing is equalized, and the external load on the casing caused by the hydrostatic pressure of the surrounding sea water is thereby eliminated.

In the illustrated embodiment, the valve seat 15 is formed by an inner surface of the casing 2 surrounding the opening 5.

The valve body 11 is guided in its axial movements upwards and downwards in the opening 5 by the sliding engagement made by the external surface of the base section 12 in the opening 5.

The displacement of the valve body 11 in the axial direction downwards is limited by the valve member 13. A laterally extending stop member 16 may be provided at the lower end of the base section 12 in order to limit the displacement of the valve body 11 in the axial direction upwards. In the illustrated embodiment, the valve body 11 is provided with a stop member 16 in the form of a flange, which extends radially from the base section 12 at the lower end thereof.

An air vent 6 is provided in an upper part of the casing 2 to allow release of air from the internal space 3 through this air vent when sea water enters into the space 3 through the opening 5 during a lowering of the subsea arrangement 1 into the sea.

A sealing member 17 surrounding the opening 5 is provided between the valve member 13 and the valve seat 15 when the valve body 11 is in the resting position. In the illustrated example, the sealing member 17 is mounted to the valve member 13, but it may alternatively be mounted to the valve seat 15.

One or more weights 18 may be mounted to the valve body 11 in order to increase the force of gravity acting to maintain the valve body 11 in its resting position. Alternatively, the valve body 11 may in itself be given a construction of sufficient mass.

In the illustrated example, the valve member 13 has the form of a plate, with a weight 18 mounted to the upper side of the plate and a ring-shaped sealing member 17 mounted to the under side of the plate. The plate extends perpendicularly in relation to the centre axis of the base section 12.

As illustrated in FIGS. 3 and 4, the weight 18 may be provided with an axial through hole 19 which co-operates with a vertical mounting pin 20 provided at the upper end of the valve body 11. The mounting pin 20 extends from an upper end surface 21 of the base section 12. The mounting pin 20 is inserted into the axial through hole 19 of the weight 18 when the weight is mounted to the valve body 11, as illustrated in FIG. 3. Thus, the weight 18 may be mounted to the valve body 11 by being pushed onto the mounting pin 20. Resiliently mounted catches 22 at the upper end of the mounting pin 20 prevents the weight 18 from sliding off the mounting pin. The catches 22 are forced radially inwards when the weight 18 is pushed down onto the mounting pin 20, and they will spring back radially outwards above the weight 18 when they pass through the upper opening of the through hole 19.

In the illustrated example, the plate-shaped valve member 13 is mountable to the base section 12 in the same manner as the weight 18, i.e. by being pushed onto the mounting pin 20. In this case, the valve member 13 is provided with an axial through hole 23 which co-operates with the mounting pin 20. The mounting pin 20 is inserted into the axial through hole 23 of the valve member 13 when the valve member is mounted to the base section 12.

The valve member 13 and the base section 12 are for instance of plastic material.

In the illustrated embodiment, sea water is allowed, when the valve body 11 is in the raised position, to flow from the surroundings into the internal space 3 of the casing through a cavity 25 provided in the base section 12.

This cavity 25 is in fluid communication with the surroundings through one or more inlet openings 26 provided in a lower part 12a of the base section. The cavity 25 has one or more lateral outlet openings 27 arranged in the base section 12 at a level between said lower part 12a of the base section and the valve member 13. The respective outlet opening 27 is arranged at such a height in the base section 12 that it is located inside the casing 2 when the valve body 11 is in the raised position so as to allow fluid flow from the surroundings into the internal space 3 of the casing through the cavity 25 and the lateral outlet openings 27 in the base section 12 when the valve body 11 is in this position, as illustrated by arrows in FIG. 2. The respective outlet opening 27 is with advantage also arranged at such a level in the base section 12 that it is located outside the casing 2 when the valve body 11 is in the resting position, as illustrated in FIG. 1.

In the illustrated example, the cavity 25 has an axial inlet opening 26 formed by an open lower end of the base section 12 and a number of radial outlet openings 27 distributed about the centre axis of the cavity 25.

The base section 12 may alternatively be designed in such a manner that sea water is allowed, when the valve body 11 is in the raised position, to flow from the surroundings into the internal space 3 of the casing through one or more flow channels extending along the external surface of the base section 12.

When the subsea arrangement 1 is lowered into the sea and reaches such a depth that the external load on the valve body 11 caused by the hydrostatic pressure of the surrounding sea water exceeds the force of gravity acting on the valve body, the valve body 11 will automatically raise from the resting position. The valve member 13 is then raised from the valve seat 15 and sea water is allowed to flow into the internal space 3 of the casing. When sea water enters into the internal space 3 of the casing, air contained in said space 3 is allowed to escape into the surroundings through the air vent 6 at the upper part of the casing 2. Hereby, the pressure of the fluid in the internal space 3 of the casing is balanced against the ambient sea water pressure. Under the effect of gravity, the valve member 13 will automatically return to the closed position in sealing contact with the valve seat 15 when the pressure of the fluid in the internal space 3 of the casing has been balanced against the ambient sea water pressure. When the subsea arrangement 1 has been installed at a subsea installation, the fluid pressure in the internal space 3 of the casing will be essentially equal to the pressure of the surrounding sea water and the valve member 13 will, under the effect of gravity, remain in the closed position and thereby prevent fluid flow into or out of the internal space 3.

In the illustrated embodiment, the subsea arrangement 1 is a heat bank for thermally insulating one or more elements 7 of a subsea installation. In this case, the internal space 3 of the casing 2 is arranged to accommodate a fluid having heat-storing capacity, for instance sea water, and said element 7 or elements is/are received in said internal space 3 with the fluid surrounding the element or elements so as to allow the fluid to delay cooling of the element or elements by means of heat stored in the fluid. The casing 2 prevents the fluid contained in the space 3 from flowing out into the surroundings. The casing 2 is preferably of thermally insulating material and/or provided with layers of thermally insulating material. The fluid enclosed in the casing 2 is intended to be heated by heat emitted from the element 7 or elements during normal operation. If the heat input to the element 7 or elements and thereby the temperature thereof would be decreased for some reason, the heat stored in the enclosed fluid will slow down the cooling of the element 7 or elements caused by the surrounding cold sea water. The heat bank could for instance be arranged to protect a subsea installation or a part thereof from cooling, such as for instance a pipe, a pipe section, a pipe connection, a valve or a valve section of a subsea oil and/or gas producing installation. Consequently, the element received in the internal space 3 of the casing could for instance constitute a part of a subsea piping system for processing or transporting oil and/or gas.

In the illustrated example, an element 7 in the form of a pipe extends through the internal space 3 of the casing.

The invention is of course not in any way restricted to the embodiments described above. On the contrary, many possibilities to modifications thereof will be apparent to a person with ordinary skill in the art without departing from the basic idea of the invention such as defined in the appended claims.

What is claimed is:

1. A subsea arrangement in the form of a heat bank for thermally insulating one or more elements of a subsea installation, the subsea arrangement comprising:
    an external casing which encloses an internal space arranged to accommodate seawater having a heat-storing capacity, therein, and arranged to receive said one or more elements of the subsea installation when deployed subsea so as to allow heat stored in the seawater within internal space and surrounding the one or more elements, to slow cooling of the one or more elements; and
    a pressure equalizing valve for equalization of fluid pressure in said internal space, comprising:
        a valve body, having:
            a base section extending through an opening provided in the casing, the base section being displaceably received in this opening, and
            a valve member secured to the base section and arranged inside the casing, the valve member extending laterally from the base section beyond the circumference of said opening in the casing; and
        a valve seat surrounding said opening in the casing, the valve member facing, the valve seat;
    wherein the valve body is axially displaceable upwards, under the effect of an external fluid pressure acting on the valve body from a resting position in which the valve member is in sealing contact with the valve seat and thereby prevents the seawater from flowing into and out of said internal space, to a raised position in which the valve member is raised from the valve seat and thereby allows the seawater to flow from the surroundings into said internal space for equalization of the fluid pressure therein when the subsea arrangement is lowered into the sea, and
    wherein the valve body is axially displaceable downwards, under the effect of gravity, from the raised position to the resting position to thereby prevent seawater from flowing into and out of said internal space when the fluid pressure in said internal space is balanced against the external fluid pressure acting on the valve body.

2. A subsea arrangement according to claim 1,
    wherein the base section of the valve body comprises a cavity which is in fluid communication with the surroundings through one or more inlet openings provided in a lower part of the base section, the cavity having one or more lateral outlet openings arranged in the base section at a level between said lower part and the valve member; and
    wherein said one or more lateral outlet openings are arranged at such a height in the base section that they are located inside the casing when the valve body is in the raised position so as to allow the seawater to flow from the surroundings into said internal space through the cavity and the lateral outlet openings in the base section when the valve body is in the raised position.

3. A subsea arrangement according to claim 2, wherein said one or more lateral outlet openings are arranged at such a height in the base section that they are located outside the casing when the valve both is in the resting position.

4. A subsea arrangement according to claim 3, wherein the cavity has an inlet opening formed by an open lower end of the base section.

5. A subsea arrangement according to claim 4, wherein a laterally extending stop member, in the form of a flange, is positioned at the lower end of the base section in order to limit the displacement of the valve, body in the axial direction upwards.

6. A subsea arrangement according to claim 5, wherein the base section is mounted to said opening in the casing through a slide bearing.

7. A subsea arrangement according to claim 6, wherein a sealing member surrounding said opening in the casing is provided between the valve member and the valve seat when the valve body is in the resting position.

8. A subsea arrangement according to claim 7, wherein in that one or more weights are mounted to the valve body.

9. A subsea arrangement according to claim 8, wherein the respective weight is provided with an axial through hole which co-operates with a vertical mounting pin provided at the upper end of the valve body, the mounting pin being inserted into this axial through hole of the weigh; when the weight is mounted to the valve body.

10. A subsea arrangement according; to claim 9, wherein the valve member is provided with an axial through hole which co-operates with said vertical mounting pin, the mounting pin being inserted into this axial through hole of the valve member when the valve member is mounted to the base section.

11. A subsea arrangement according to claim 10, wherein the valve member and the base section are of plastic material.

12. A subsea arrangement according to claim 11, wherein an air vent is provided in an upper part of the casing to allow release of air from said internal space.

13. A subsea arrangement according claim 12, wherein said opening in the easing is provided in a bottom all of the casing.

14. A subsea arrangement according to claim 13, wherein the valve member has the form of a plate.

15. A subsea arrangement according to 14, wherein the external casing and pressure equalizing value are configured such that the seawater surrounding the one or more elements is heated by heat emitted from the one or more elements during certain subsea operations, and cooling of the one or more elements is slowed when the temperature thereof is decreased.

16. A subsea arrangement in the form heat bank for thermally insulating one or more elements of a subsea installation, the subsea arrangement comprising
an external casing which encloses an internal space arranged to accommodate seawater having a heat-storing capacity, therein, and arranged to receive said one or more elements of subsea installation when deployed subsea as to allow heat stored in the seawater within the internal space and surrounding the one or more elements, to slow cooling of the one or more elements; and
a pressure equalizing valve for equalization of fluid pressure in said internal space, comprising:
a valve body, having:
a base section extending, through an opening provided in the casing, the base section being displaceably received in this opening, and
a valve member secured to the base section and arranged inside the casing, the valve member extending laterally from the base section beyond the circumference of said opening in the casing; and
a valve seat surrounding said opening in the casing, the valve member facing the valve seat;
wherein the valve body is axially displaceable upwards, under the effect of an external fluid pressure acting on the valve body from a resting position in which the valve member is in sealing contact with the valve seat and thereby prevents the seawater from flowing into and out of said internal space, to a raised position in which the valve member is raised from the valve seat and thereby allows the seawater to flow from the surroundings into said internal space for equalization of the fluid pressure therein when the subsea arrangement is lowered into the sea,
wherein the valve body being axially displaceable downwards, under the effect of gravity, from raised position to the resting position to thereby prevent seawater from flowing into and out of said internal space when the fluid pressure in said internal space is balanced against the external fluid pressure acting on the valve body,
wherein the base section of the valve body comprises a cavity in fluid communication with the surrounding subsea environment through one or more inlet openings provided in a lower part of the base section, the cavity having one or more lateral outlet openings arranged in the base section at a level between said lower part and the valve member, and
wherein said one or more lateral outlet openings are arranged at such a height in the base section that they are located inside the casing when the valve body is in the raised position so as to allow the seawater to flow (as in claim 2) from the surrounding subsea environment and into said internal space through the cavity and the lateral outlet openings in the base section when the valve body is in the raised position.

17. A subsea arrangement according to 16, wherein said one or more lateral outlet openings are arranged at such a height in the base section that they are located outside the casing when the valve body is in the resting position.

18. A subsea arrangement according to claim 17, wherein the cavity has an inlet opening formed by an open lower end of the base section.

19. A subsea arrangement in the form of a heat bank for thermally insulating one or more elements of a subsea installation, the subsea arrangement comprising:
an external casing which encloses an internal space arranged to accommodate seawater having a heat-storing capacity, therein, and arranged to receive said one or more elements of the subsea installation when deployed subsea so as to allow heat stored in the seawater within the internal space and surrounding the one or more elements, to slow cooling of the one or more elements; and
a pressure equalizing valve for equalization of fluid pressure in said space, the comprising:
a valve body, having:
a base section extending through an opening provided in the casing, the base section being displaceably received in this opening, and
a valve member secured to the base section and arranged inside the casing, the valve member extending laterally from the base section beyond the circumference of said opening in the casing; and
a valve seat surrounding said opening in the casing, the valve member facing the valve seat;
wherein the valve body is axially displaceable upwards, under the effect of an external fluid pressure acting on the valve body from a resting position in which the valve member is in sealing contact with the valve seat and thereby prevents the seawater from flowing into and out of said internal space, to a raised position in which the valve member is raised from the valve seat and thereby allows seawater to flow from the surroundings into said internal space for equalization of the fluid pressure therein when the subsea arrangement is lowered into the sea,
wherein the valve body being axially displaceable downwards, under the effect of gravity, from the raised position to the resting position to thereby prevent seawater from flowing into and out of said internal space when the fluid pressure said internal space is equalized with the external fluid pressure acting on the valve body, wherein the base section of the valve body comprises a cavity in fluid communication with the surroundings through one or more inlet openings provided in a lower part at the base section, the cavity having one or more lateral outlet openings arranged in the base section at a level between said lower part and the valve member, wherein said one or more lateral outlet openings are arranged at such a height in the base section that they are located inside the casing when the valve body is in the raised position so as to allow the seawater to flow from the surroundings into said internal space through the cavity and the lateral outlet openings in the base section when the valve body is in the raised position, and wherein said one or more lateral outlet openings are arranged at such a height in the base section that they are located outside the casing when the valve body is in the resting position.

20. A subsea arrangement according to claim 19, wherein a laterally extending stop member, in the form of a flange, is positioned at the lower end of the base section in order to limit the displacement of the valve body in the axial direction upwards.

* * * * *